Dec. 6, 1927.
N. G. DOWDELL
1,651,515
RADIOFREQUENCY TRANSFORMER
Filed Jan. 22, 1925
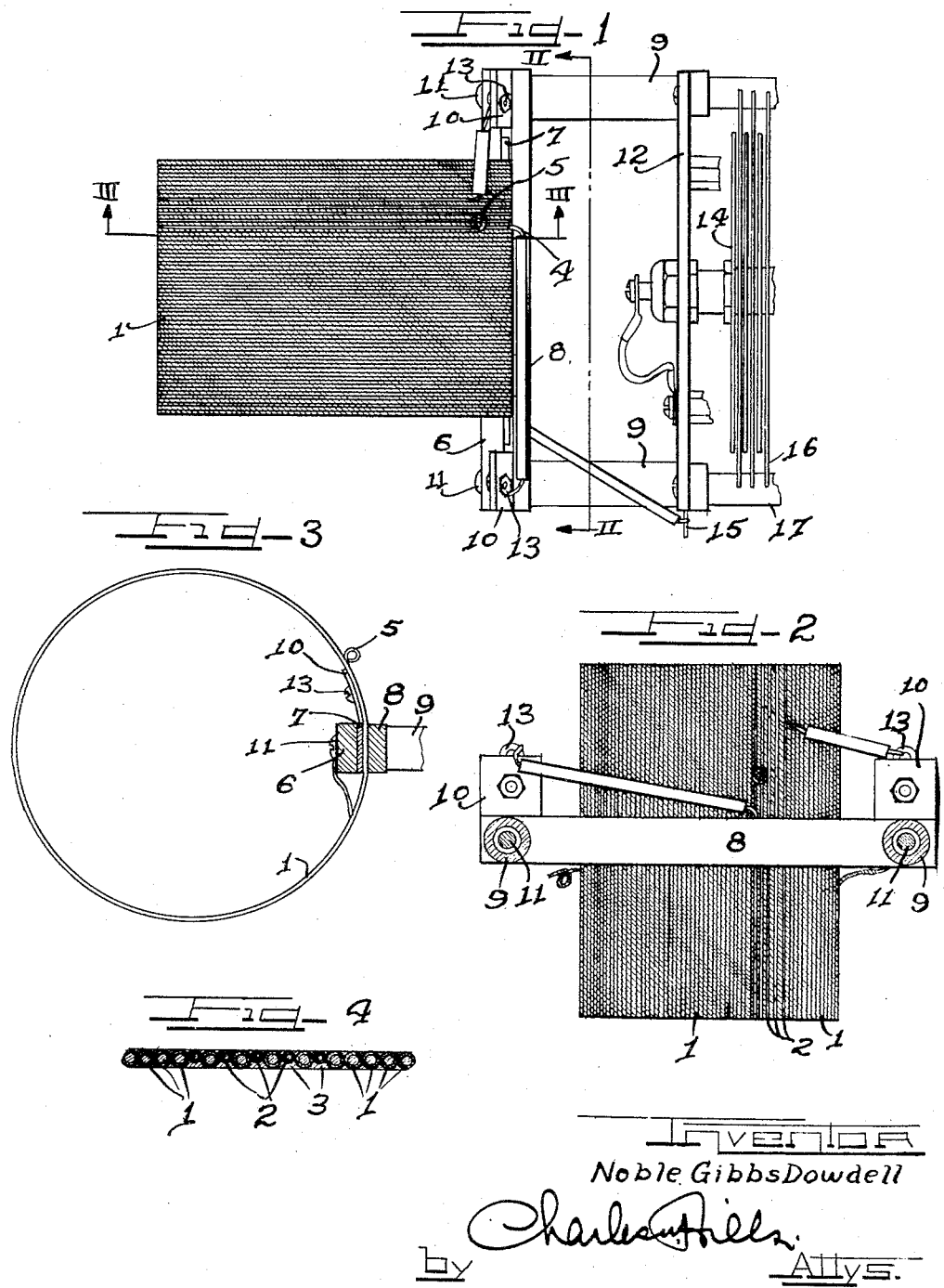
Inventor
Noble Gibbs Dowdell
by Charles M. Hills
Attys.

Patented Dec. 6, 1927.

1,651,515

UNITED STATES PATENT OFFICE.

NOBLE GIBBS DOWDELL, OF CHICAGO, ILLINOIS, ASSIGNOR TO UNITED ELECTRIC CO. OF CHICAGO, OF CHICAGO, ILLINOIS, A CORPORATION OF ILLINOIS.

RADIOFREQUENCY TRANSFORMER.

Application filed January 22, 1925. Serial No. 3,934.

This invention relates to radio coils and mountings therefor, and more particularly such coils and mountings as are adapted to be combined with a variable condenser to form a radio frequency transformer.

It is an object of this invention to provide such a coil in a radio frequency transformer which will produce a maximum efficiency.

It is also an object of this invention to provide an improved radio frequency transformer.

It is further an object of this invention to provide a device of this class which has a very low loss.

It is also an object of this invention to provide a coil which may be easily manufactured and economically produced.

It is further an object of this invention to provide a device of this class which may be readily and easily installed.

It is also an object of this device to provide a coil of this class which has a minimum amount of distributor capacity.

It is also an object of this invention to provide a device of this class in which the primary coils are wound with the secondary coils.

With the above and other objects in view, it will be apparent this invention consists in the construction, combination and arrangement of parts, all as hereinafter more fully described, claimed and illustrated in the accompanying drawings.

On the drawings:

Figure 1 shows a side view of a coil and mounting therefor embodying this invention.

Figure 2 is a section on the line 2—2 of Figure 1.

Figure 3 is a section on the line 3—3 of Figure 1.

Figure 4 is a detail cross sectional view of the primary and secondary coils.

As shown on the drawings:

The secondary coil 1 and primary coil 2 are constructed by winding the same about a collapsible mandrel or suitable removable core (not shown). They are then covered with a material 3 such as celluloid, glue or collodion which has a minimum of capacity. They are then baked and the collapsible mandrel or removable core is removed, leaving the coil in permanent rewound condition with a minimum of capacity. The secondary coil 1 is wound a considerable distance up to the point 4 when the primary coil 2 is laid in juxtaposed relation with each winding of the secondary coil 1, the winding of the secondary coil 1 being continued. After a suitable number of turns of the primary coil 2 have been obtained, the number in this case being five, it is laid out and the winding of the secondary coil 1 is continued as before without the primary coil windings being laid in juxtaposed relation with each winding thereof. The amount of winding of the secondary coil 1 before commencing the simultaneous winding therewith of the primary coil 2 and the amount of winding of said secondary coil 1 after discontinuing the simultaneous winding of the primary coil 2 therewith is immaterial as the primary coil may be interlaid anywhere along the length of the secondary coil 1. A tap 5 is usually made in the coil 1 during the winding process in an obvious manner. A mounting comprising a strip 6 extending along the inner side of the coils having therebeneath a second strip 7 which contacts with the inside of the coil. A third strip 8 extending along the outside of the coil in juxtaposed relation with the strips 7 and 6 and cylindrical members 9 is adapted to support the coil. A pair of thin members 10 are adapted to be engaged between the strips 6 and 8, the thickness of the members 10 being approximately the same as the thickness of the coil and the strip 7. The members 6, 7, 8, 9 and 10 are of nonconducting material, preferably of the fibrous substance. The cylindrical members 9 are hollowed. The members 10 in the opposite ends of the strips 6 and 8 are apertured for receiving therethrough bolts 11. The bolts 11 are adapted to rigidly engage with the supports 12 of a variable condenser and may be electrically connected to either the fixed or the movable plates thereof. In this case they are shown electrically connected to the movable plates. The two ends of the primary coil 2 are connected to binding posts 13 mounted on the members 10. One end of the secondary coil 1 is electrically connected to one of the bolts 11 which communicates electrically with the movable plates 14 of the condenser and the other end of the secondary coil 1 is connected to a binding post 15 which communicates electrically with the fixed plates 16 of the condenser by way of the supports 17 therefor.

It will be seen that a very compact radio frequency transformer is thus obtained and that by winding the primary and secondary coils as shown there results a very low loss in efficiency. It is also apparent that the radio frequency transformer may be economically manufactured.

In the appended claims the terms primary and secondary are used for purposes of description only and it is to be understood that as used in said claims what is defined as the primary may also be the secondary or vice versa and still be within the scope of these claims.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A radio frequency transformer including a self-sustaining cylinder of one diameter throughout and having its wall of the same thickness throughout, said wall including primary and secondary coils, the windings of which are held in the same plane by a hardening substance, the windings of one coil alternating with the windings of the other coil.

2. A radio frequency transformer consisting of a self-sustaining cylinder of one diameter throughout, a pair of posts beyond opposite ends of said cylinder, a pair of clamping bars, one within and one without the cylinder, connected at their ends to said posts and clamping the cylinder by engagement therewith at a single point in its circumference, said cylinder having primary and secondary coils in the same plane, the windings of which alternate, and a hardening material connecting said windings and presenting with the coils a wall of the same thickness throughout.

3. A radio frequency transformer including a self-sustaining cylinder of one diameter throughout and consisting of primary and secondary coils in a single layer, the windings of said coils alternating in the same plane, and a hardening material connecting the coil windings and forming therewith a wall of the same thickness throughout.

In testimony whereof I have hereunto subscribed my name.

NOBLE GIBBS DOWDELL.